J. H. Manny.

Mower.

Patented Oct. 17, 1854.
Reissued Mar. 6, 1855

No 300

J. H. Manny.

Mower.

Patented Oct. 17, 1854.
Reissued Mar. 6, 1855.

No. 300

Sheet 2 - 3 Sheets.

J. H Manny.

Mower.

Patented Oct. 17, 1854.
Reissued Mar. 6, 1855.

No 300

UNITED STATES PATENT OFFICE.

JOHN H. MANNY, OF ROCKFORD, ILLINOIS.

IMPROVEMENT IN GRAIN AND GRASS HARVESTERS.

Specification forming part of Letters Patent No. 11,810, dated October 17, 1854; antedated June 15, 1854; Reissue No. 300, dated March 6, 1855.

DIVISION C.

*To all whom it may concern:*

Be it known that I, JOHN H. MANNY, of Rockford, in the county of Winnebago and State of Illinois, late of Freeport, in the county of Stephenson, in the same State, have invented certain new and useful Improvements in Harvesting-Machines, of which the following is a full, clear, and exact description, reference being had to the accompanying drawings, which make part of this specification, and in which—

Figure 1:
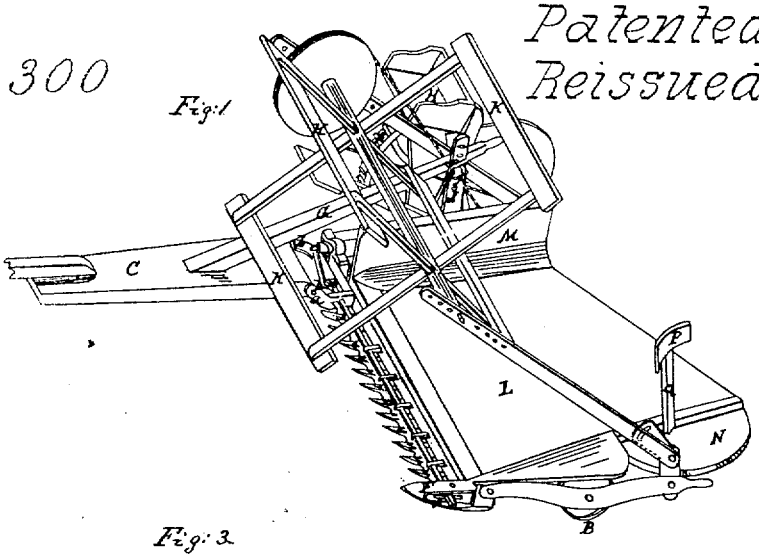
Figure 3:
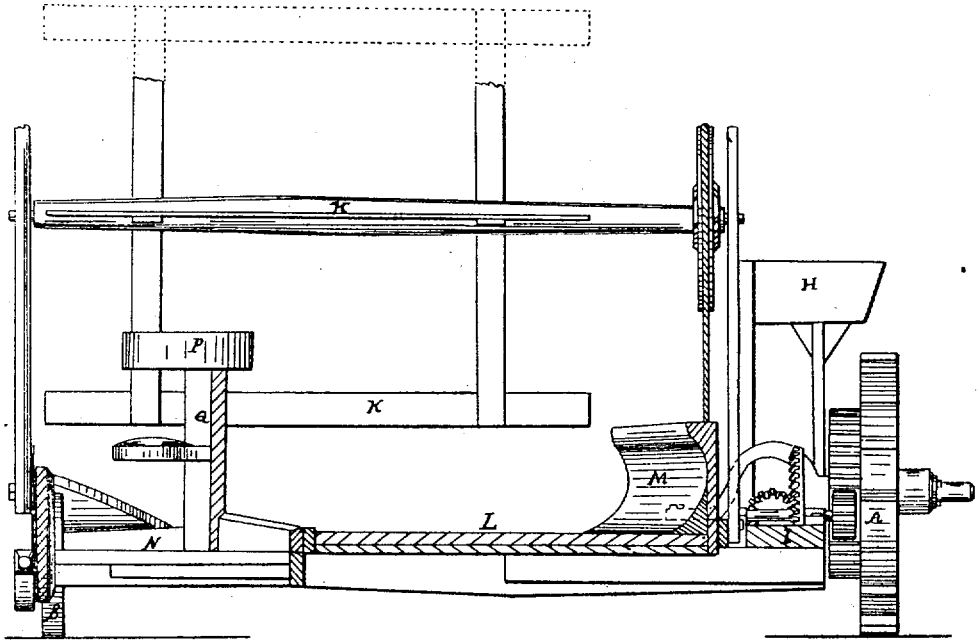
Figures 2, 6:
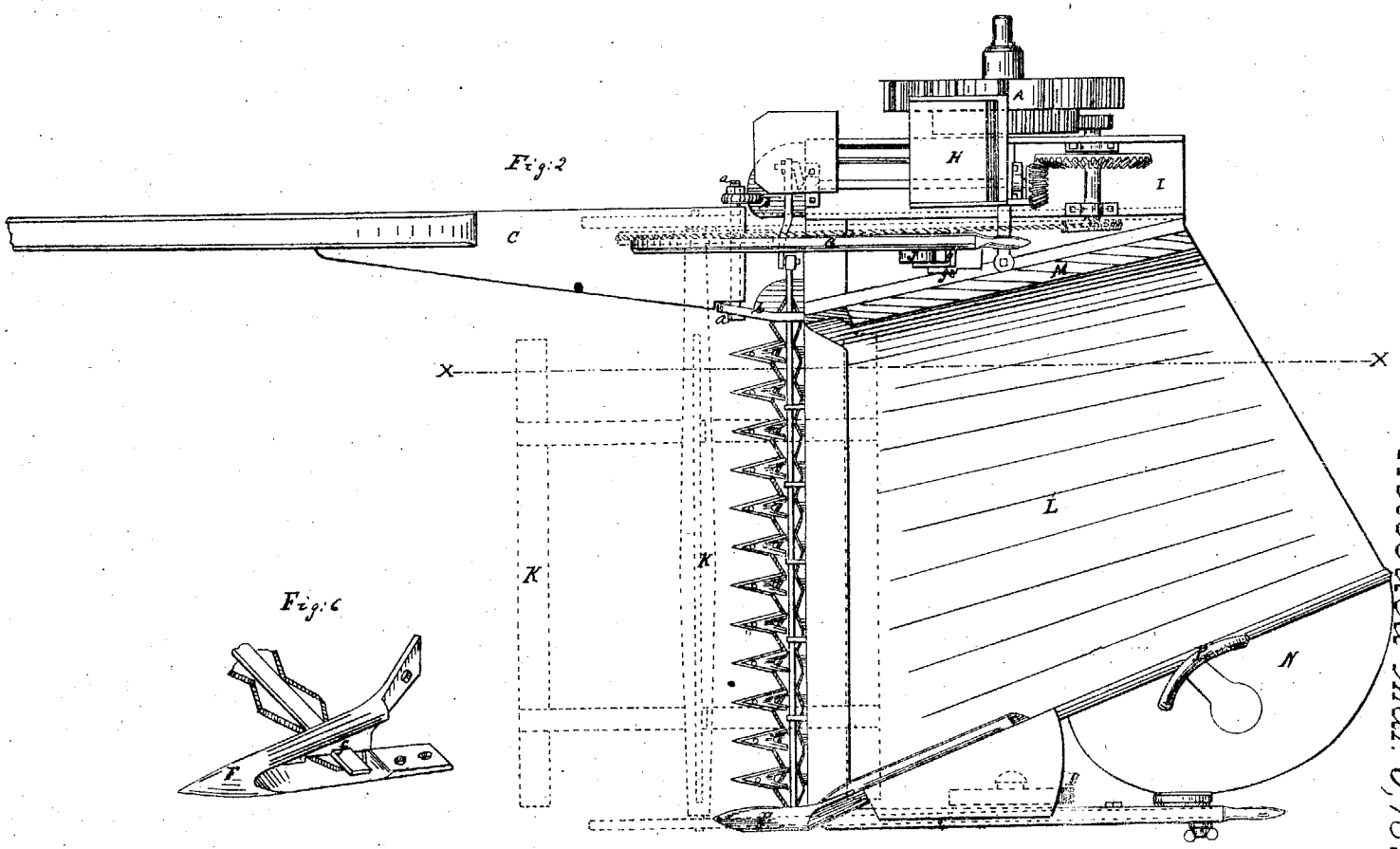
Figure 4:
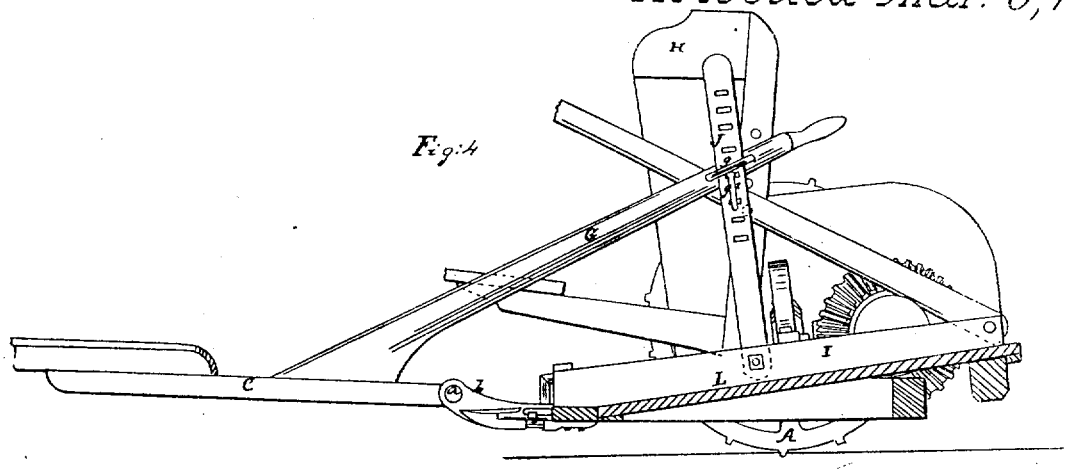
Figure 5:
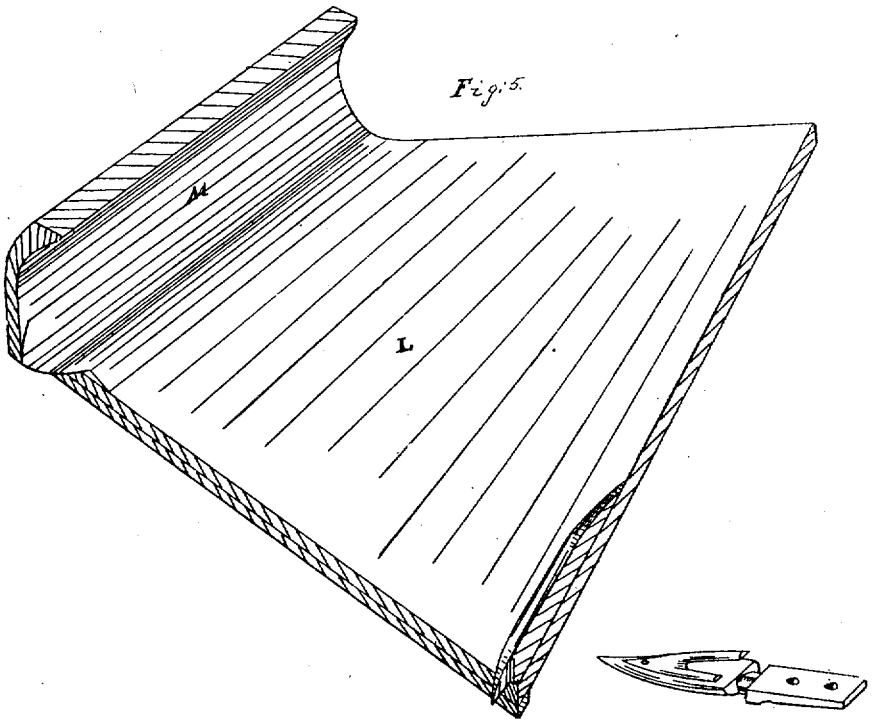

Figure 1 represents a view in perspective of a machine embracing my improvements. Fig. 2 represents a top view of the same. Fig. 3 represents a rear end view of the same. Fig. 4 represents a section at the line *x x* of Fig. 1, with the fence, guard, or wing of the platform removed to exhibit more clearly the arrangement for adjusting the cutters at varying distances from the ground. Fig. 5 represents a view in perspective of the removable platform, and the fence or wing detached from the machine, and Fig. 6 represents a similar view of the hollow dividing-finger at the inner end of the machine and that portion of the end of the sickle or cutter which has its bearing therein.

In a patent bearing the same date as this I have pointed out some of the advantages resulting from the location of the stand or seat for the forker at the end of the machine adjacent to the standing grain. Therefore I need not here repeat them, my object in this patent being to secure my invention for compressing the grain into a compact mass before discharging it off the platform, which I effect by means of a fence, guard, or wing on the outer end of the platform to gather and compress the grain against, in combination with the forker's stand or seat at the opposite or inner end of the platform, whence the grain can be conveniently pushed against the fence, and then compressed by the forker merely leaning against his fork, while it grasps the grain and is holding it against the guard. By this means the compression of the grain is effected by little muscular effort, and discharged from the platform with about the same amount of labor that a loose gavel is discharged in the ordinary way. The guard should be made concave on its inner side and very smooth. It may be made of hard wood, or, what would be still better, wood lined with sheet-iron. The length and height of the guard and its direction will depend to some extent upon the size of the machine, the width of the platform, and the point at which it is intended to discharge the grain.

The accompanying drawings represent a harvesting-machine embracing the improvement which is the subject of the present patent. The machine is supported on two wheel, A and B, and provided with driving-gear suitable for giving motion to the cutters and reel; but as the construction and arrangement of the driving-gear and reel are similar to those described in my former patents I deem it unnecessary to describe them particularly here.

The tongue C, by which the horses draw the machine, is attached to the finger-bar, near its outside or right end, by means of a bolt, *a*, passing through ears *b*, and forming a hinge-joint nearly in a line with the front ends of the fingers, which allows the front of the frame to be elevated or depressed in this line.

On the top of the tongue C is an inclined arm, G, which extends upward and backward within reach of the driver, whose seat, H, is mounted on the frame I. The tongue and arm together resemble the letter Y with one limb shorter than the other. The arm G has a staple, *g*, projecting from its side, through which an upright bar, J, passes, whose lower end is hinged to the frame I. This hinged bar J has a series of holes in it, into any one of which a strong pin, $g^2$, is inserted to limit the descent of the arm G on the bar J. By this arrangement it is obvious that as the front extremity of the tongue is firmly held by the horses, when the arm G is raised or lowered it will impart a corresponding movement to the front edge of the machine which carries the cutting apparatus, so that the adjustment of the cutter to cut the grain at varying heights is made by raising or lowering the arm G on the bar J and placing the pin $g^2$ beneath it in the proper hole to hold it from falling below the required elevation. The axles of the supporting-wheels constitute the fulcra upon which the frame turns, while the flexure of the machine to vary the adjustment is at the joint which connects the tongue and finger-bar.

The divider F projects on the left side of the machine in advance of the guard-fingers and divides the grain to be cut from that which is to be left standing. It has an oblong hole, *f*, made in its inner side, through which the end of the sickle plays. This dividing-bar F is made hollow, as represented, so that, excepting the point, which is solid, it is a mere shell. The stock of the sickle has not sufficient length of bearing in the hole *f* in the side of this divider for grass and grain to effect a lodgment and clog the sickle.

The reel K is represented in Fig. 1 by black, and in Fig. 2 by blue, lines. The left side of the platform L extends from the left end of the finger-bar and cutters toward the rear of the machine, and as it extends backward inclines toward the right or outer side of the machine, and therefore diverges from the outer end of the frame a sufficient distance to give room in the angle between the two for a stand or seat for the raker. The divergence of this platform from the outer end of the finger-bar and from the standing grain is such that when the cut grain is discharged behind it upon the ground the gavel will be far enough removed from the standing grain to leave a clear track between them for a horse to travel in on his return while drawing the machine to cut the next swath. On the right or outer side of the oblique platform a fence, guard, or wing, M, is placed, whose length is the same as the platform at that side, and whose inner side should be made concave. This wing, as well as the platftom, is removable at will from the frame, so that when the machine is used for mowing both the fence and platform may be taken off. An attendant pushes the cut grain gathered upon the platform with a fork against this concave wing into a compact bundle, and then pitches, slides, or delivers it upon the ground in a compact mass by a lateral movement of the fork.

Between the left side of the platform and the left side of the machine a seat, stand, or position, N, is arranged for the attendant whose duty it is to fork the grain off the platform. This stand may be provided with a seat like that of Hussey's, Randall's, Hite's, or other old machines in case it is thought desirable by any one for the forker to sit; or it may be provided with a guard-rail, P, on the top of a post, Q, for the forker to steady himself against in case he chooses to stand. This guard-rail may surround the stand, or may be placed only on the side next the platform, but this every competent constructor will determine for himself, as the various forms of support any one would require to use have been long known and public property, and any one is at liberty to use them. The position of the raker's stand or seat is such that the forker can, if he chooses, push the grain directly back in discharging it in nearly a direct line from the cutters, instead of first pushing it over against the fence to render it more compact. In case the grain is discharged by pushing it directly back, a fork with a large number or tines should be used sufficient to spread nearly the whole width of the platform, that the forker may push the cut grain from the whole width of the platform directly backward at a single stroke to deliver the gavel evenly upon the ground behind the platform. This I do not deem as good a mode of discharging the grain as when it is first pushed across the platform against the wing and then shoved back, as the gavel is not so compact, so I prefer to discharge the grain with a common three-tined fork, first pushing it from the left side of the platform to the right, then pressing it against the concave guard to form it into a compact bundle, and lastly sliding it off endwise upon the ground behind the platform by a lateral movement of the fork.

What I claim as my invention, and desire to secure by Letters Patent, is—

The combination of the fence to compress the grain against at the outer end of the machine and guide it while sliding off the platform and the position, stand, or seat for the forker at the inner end of the platform with the platform, substantially as herein set forth.

In testimony whereof I have hereunto subscribed my name.

JOHN H. MANNY.

Witnesses:
P. H. WATSON,
A. E. H. JOHNSON.